US008916268B2

(12) United States Patent
Kawano et al.

(10) Patent No.: US 8,916,268 B2
(45) Date of Patent: Dec. 23, 2014

(54) IRON POWDER FOR DUST CORES

(75) Inventors: Takashi Kawano, Chiba (JP); Noriko Makiishi, Chiba (JP); Tatsuhiko Hiratani, Kurashiki (JP); Naomichi Nakamura, Chiba (JP); Yusuke Oishi, Nagoya (JP); Eisuke Hoshina, Toyota (JP); Toshiya Yamaguchi, Nishikamo-gun (JP); Daisuke Okamoto, Toyota (JP); Takeshi Hattori, Aichi-gun (JP)

(73) Assignees: JFE Steel Corporation, Tokyo (JP); Toyota Jidosha Kabushiki Kaisha, Toyota (JP)

( * ) Notice: Subject to any disclaimer, the term of this patent is extended or adjusted under 35 U.S.C. 154(b) by 509 days.

(21) Appl. No.: 12/733,699

(22) PCT Filed: Dec. 11, 2008

(86) PCT No.: PCT/JP2008/073026

§ 371 (c)(1), (2), (4) Date: Jun. 1, 2010

(87) PCT Pub. No.: WO2009/078453

PCT Pub. Date: Jun. 25, 2009

(65) Prior Publication Data

US 2010/0239879 A1 Sep. 23, 2010

(30) Foreign Application Priority Data

Dec. 14, 2007 (JP) ................................ 2007-323925

(51) Int. Cl.

*B22F 1/02* (2006.01)
*B32B 15/02* (2006.01)
*H01F 1/33* (2006.01)
*H01F 1/24* (2006.01)

(52) U.S. Cl.

CPC .. *H01F 1/33* (2013.01); *H01F 1/24* (2013.01); *B22F 2998/00* (2013.01); *B22F 1/02* (2013.01)

USPC ............................ 428/403; 428/404; 428/570

(58) Field of Classification Search

None

See application file for complete search history.

(56) References Cited

FOREIGN PATENT DOCUMENTS

| | | |
|---|---|---|
| JP | A 7-235429 | 9/1995 |
| JP | A 11-87123 | 3/1999 |
| JP | A 2003-217919 | 7/2003 |
| JP | A 2003-303711 | 10/2003 |
| JP | A 2005-8959 | 1/2005 |
| JP | A 2005-146315 | 6/2005 |
| JP | A 2007-231330 | 9/2007 |
| JP | A 2007-231331 | 9/2007 |

OTHER PUBLICATIONS

Tartaj et al. ("Magnetic behavior of superparamagnetic Fe nanocrystals confined inside submicron-sized spherical silica particles", Physical Review B, 69, 094401 (2004)).*

(Continued)

*Primary Examiner* — Mark Ruthkosky
*Assistant Examiner* — Alexandre Ferre
(74) *Attorney, Agent, or Firm* — Oliff PLC

(57) ABSTRACT

An iron powder for dust cores is provided which can be formed into a dust core having a high resistivity and having a low iron loss without degrading the mechanical strength. The iron powder for dust cores includes an iron powder and an oxide film on the surface thereof, wherein the oxide film is composed of a Si-based oxide in which the ratio of Si to Fe satisfies Si/Fe≥0.8 on an atomic number basis.

4 Claims, 1 Drawing Sheet

(56) References Cited

OTHER PUBLICATIONS

International Search Report issued for International Application No. PCT/JP2008/073026 on Apr. 7, 2009 (with translation).

Written Opinion of the International Searching Authority issued in Patent Application No. PCT/JP2008/073026, dated Apr. 7, 2009 (with trans.).

* cited by examiner

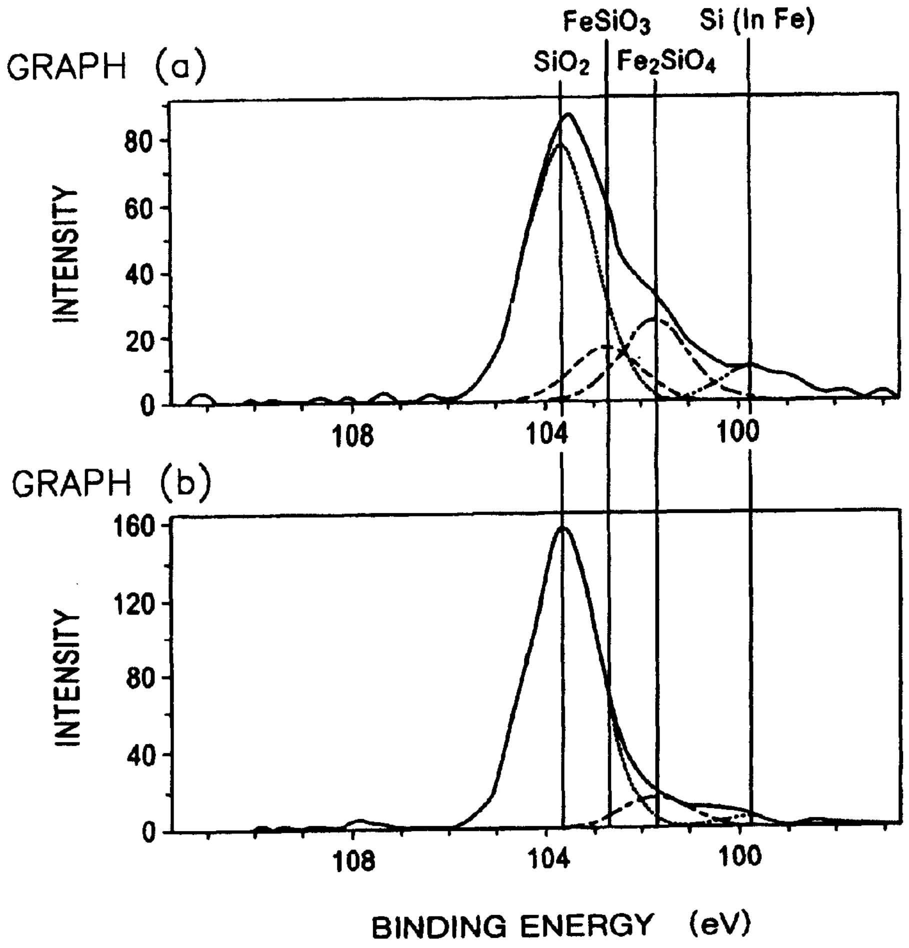
GRAPH (a)
FeSiO3
Si (In Fe)
SiO2
Fe2SiO4
INTENSITY
80
60
40
20
0
108
104
100
GRAPH (b)
160
120
80
40
0
INTENSITY
108
104
100
BINDING ENERGY (eV)

IRON POWDER FOR DUST CORES

TECHNICAL FIELD

The present invention relates to an iron powder for dust cores.

BACKGROUND ART

As a soft magnetic material for cores of motors and transformers, a magnetic steel sheet is generally used at low drive frequencies of several kilohertz or less. In addition, at high frequencies of several tens of kilohertz or more, an oxide magnetic material, such as Mn—Zn-based ferrite, is generally used.

On the other hand, dust cores formed by compaction of iron powders are used at several tens of kilohertz or less in many cases. Since being formable by die-molding, the dust core has a very high degree of freedom of a product shape, and since even a complicated core shape can be manufactured by a simple process with high precision, the usefulness of the dust core has drawn attention.

One of important factors determining the properties of the dust core as described above is the iron loss, and in order to realize high performance (that is, reduction of iron loss) of the dust core, various proposals have been made on iron powders.

For example, in Japanese Unexamined Patent Application Publication No. 2003-217919 (Patent Document 1), a technique for reducing the iron loss has been disclosed in which Si is contained in iron powder particles and an insulating material primarily composed of $SiO_2$ and MgO is provided between the iron powder particles. In addition, in Japanese Unexamined Patent Application Publication No. 11-87123 (Patent Document 2), a technique for improving the initial permeability (having an influence on the iron loss) in a high frequency region has been disclosed in which the content of Si and the distribution thereof are controlled so that the Si concentration at the surface portion is higher than that at the central portion.

When the dust core is manufactured, iron powder particles are preferably insulated from each other, and as an insulating method, for example, there may be mentioned a method in which after an insulating material is mixed with the iron powder particles, compaction is performed (for example, see the above Patent Document 1). In addition, as another insulating method, an iron powder for compacted iron powder processed by insulation coating has also been proposed. For example, in Japanese Unexamined Patent Application Publication No. 2003-303711 (Patent Document 3), an iron-base powder covered with a coating film containing a silicone resin and pigment has been proposed.

In addition, in Japanese Unexamined Patent Application Publication No. 2007-231330 (Patent Document 4), as a method for manufacturing a metal powder for dust cores, a technique has been disclosed in which Si is enriched on the surface of the metal powder by a gas-phase reaction and in which an insulation coating treatment is further performed whenever necessary. In the Patent Document 4, it has also been disclosed that when the surfaces of the powder particles processed by the gas-phase reaction are oxidized to form $SiO_2$, heat generation of fine particles can be avoided, and/or the adhesion to an insulation coating material can be improved. However, examples in which the effects described above are verified have not been disclosed.

DISCLOSURE OF INVENTION

Problems to be Solved by the Invention

However, in an iron powder pre-alloyed with Si as described in the Patent Document 1, the hardness of the iron powder is increased since Si is contained, and as a result, plastic deformation during compaction is inhibited. Hence, there have been problems, for example, in that magnetic properties are not improved, and the reliability is degraded due to a decrease in mechanical strength of the dust core.

In addition, even when the content of Si in the iron powder and the distribution thereof in the whole iron powder are controlled as described in the Patent Document 2, there have been problems, for example, in that an oxide film is formed on the surface of the iron powder particles, and this oxide film harms the magnetic properties. In the iron powder provided with the insulation coating by the method described in the Patent Document 4, the resistivity obtained when a dust core is formed is not a sufficient level in practical applications.

The present invention advantageously solves the above problems, and an object of the present invention is to propose an iron powder for dust cores which causes no degradation in magnetic properties and mechanical strength and which has significantly high reliability.

Means for Solving the Problems

Accordingly, in order to solve the above problems, intensive research focusing on properties of an oxide film provided on an iron powder surface has been continuously carried out by the inventors of the present invention, and as a result, it was found that the above object can be advantageously achieved when the composition of the surface oxide film is optimized.

The present invention was made based on the above findings.

That is, the summary of the present invention is as follows.

(1) An iron powder for dust cores includes: an iron powder; and an oxide film provided on the surface thereof, wherein the oxide film consists substantially of a Si-based oxide in which an atomic number ratio of Si to Fe satisfies $Si/Fe \geq 0.8$.

(2) In the iron powder for dust cores according to the above (1), the Si-based oxide contains 60 mass percent or more of $SiO_2$.

(3) In the iron powder for dust cores according to the above (1) or (2), in the Si-based oxide, the weight ratio of $SiO_2$ to $Fe_2SiO_4$ is seven times or more.

BRIEF DESCRIPTION OF DRAWINGS

FIG. 1 is a view showing, for comparison, an graph (a) (upper part) of peak separation by XPS of Si2p of an iron powder for dust cores of the present invention and an graph (b) (lower part) of peak separation of Si2p of another more ideal iron powder for dust cores of the present invention.

BEST MODES FOR CARRYING OUT THE INVENTION

Hereinafter, the present invention will be described in detail.

In accordance with the present invention, when the surface of an iron powder is covered with a Si-based oxide, and when the composition thereof is controlled to satisfy $Si/Fe \geq 0.8$ and preferably $Si/Fe \geq 1.1$, a dust core having superior magnetic properties can be obtained. Although the mechanism thereof has not been clearly understood, it is believed that when the composition of the oxide film is controlled so as to satisfy Si/Fe≥0.8, high insulating properties are maintained even during compaction, and an eddy current induced in a compacted powder body in an alternating magnetic field and an eddy-current loss generated thereby can both be suppressed.

As one of reasons the high insulating properties are maintained during compaction, an improvement in wettability of a resin used for insulation between iron powder particles may be mentioned. It is believed that when a resin is applied to outermost surfaces of iron powder particles, if the surfaces of the iron powder particles are uniformly covered with a Si-based oxide, the affinity with the resin is improved, and as a result, the wettability is improved. In particular, when a Si-based resin is used as a coating material as described above, a significant effect can be obtained. In addition, since a wettability of the resin is improved in accordance with the above mechanism, a high resistance layer is very uniformly formed at each grain boundary (boundary between iron powder particles) formed by compaction, and as a result, high insulating properties are obtained in the molded body.

As a method for forming a Si-based oxide on an iron powder surface, a two-stage treatment is preferably performed such that Si is deposited on the iron powder by a gas-phase reaction method such as a PVD (physical vapor deposition) method or a CVD (chemical vapor deposition) method, followed by performing a treatment in an oxidizing atmosphere. However, a method in which the above treatments (Si deposition/surface enrichment treatment and oxidation treatment) are simultaneously performed may also be used, and the method is not particularly limited. In addition, the iron powder used in the present invention is not particularly limited, and for example, an atomized iron powder, a reduced iron powder, and an electrolytic iron powder may be used. Although the composition and the dimension of the iron powder are not particularly limited, pure iron powder in which Fe≥99 mass percent is satisfied is preferable, and the average particle diameter is preferably in the range of approximately 10 to 500 μm.

Next, a preferable coating method for enriching Si on the iron powder surface will be more particularly described by way of example with reference to a CVD method which uses a $SiCl_4$ gas. However, the present invention is not limited to the following method.

After an iron powder is spread in a quartz-made container so as to have a thickness of 5 mm or less and more preferably 3 mm or less, heating is performed in a non-oxidizing atmosphere at 700° C. or more and 1,400° C. or less. Next, a $SiCl_4$ gas is supplied to the iron powder in the container at a ratio of 0.01 to 10 NL/min/kg (that is, 0.01 to 10 NL/min per 1 kg of the iron powder). As a result, by a reaction shown below, $Fe_3Si$ is formed on the iron powder surface, and a high Si concentration layer is formed thereon (hereinafter referred to as “deposition reaction”).

$$SiCl_4+5Fe \rightarrow Fe_3Si+2FeCl_2$$

In the above method, when the thickness of the iron powder layer is more than 5 mm, the $SiCl_4$ gas cannot be sufficiently brought into contact with the whole iron powder particles, and hence it is difficult to uniformly form $Fe_3Si$ on all surfaces of the iron powder particles. Hence, when a large amount of iron powder is to be treated, in order to suppress a non-uniform gas-phase reaction, the treatment is preferably performed while the iron powder is being agitated. As a method for agitating the iron powder, for example, there may be mentioned a method in which a container itself receiving the iron powder is rotated, a method in which the iron powder is agitated by an agitation blade, or a method in which the iron powder is fluidized by supplying a non-oxidizing gas, a reaction gas such as $SiCl_4$, or a mixed gas thereof into the container; however, the method is not limited to those described above.

In consideration of the effect and the economical aspect, the flow rate of the $SiCl_4$ gas is preferably set in the range of approximately 0.01 to 10 NL/min/kg with respect to the weight of the iron powder in the container.

Oxidation of the iron powder surface may be performed by an oxidation treatment in which an oxidizing gas is added during the above Si deposition reaction. In addition, as another method, after the Si deposition reaction is completed, an oxidation treatment may be additionally performed using an oxidizing gas. As an industrially usable oxidizing gas, $O_2$, $H_2O$, CO, and the like may be mentioned; however, the types thereof are not particularly limited.

In the manufacturing process as described above, the above ratio Si/Fe can be controlled by the CVD conditions and/or the oxidation conditions. Roughly speaking, when the CVD time and/or temperature is increased, the ratio Si/Fe is increased, and in addition, when the oxygen partial pressure in the subsequent oxidation treatment is increased, the ratio Si/Fe can also be increased. In addition, when the temperature and/or the oxygen partial pressure in the oxidation treatment is increased, the amount of $SiO_2$ and the ratio $SiO_2/Fe_2SiO_4$ tend to increase.

In addition, the composition of a surface layer oxide can be analyzed by x-ray photoelectron spectroscopy (XPS) or auger electron spectroscopy (AES). XPS is a method for measuring a spectrum of photoelectrons generated by x-ray irradiation, and AES is a method for measuring a spectrum of auger electrons generated by electron beam irradiation. In both measurements, since the peak positions (energy) of Si and Fe are predetermined, by measuring the intensities and using sensitivity coefficients obtained in advance, the above elements can be quantified.

A method for quantifying Si and Fe on the surface by using XPS will be described by way of example.

An iron powder sample firmly adhered to an electrical conductive tape is inserted in an XPS apparatus, and a 0.5 mm-square area of the sample is irradiated with AlKα rays as x rays. Photoelectrons generated from the irradiated area are measured by a spectrometer, and the intensities of Si2p and Fe2p are cumulatively calculated. The intensities thus obtained are converted into the quantitative values using respective relative sensitivity coefficients. The atomic ratio Si/Fe on the iron powder surface obtained by the above measurement method must satisfy Si/Fe≥0.8 in order to obtain a dust core having superior magnetic properties. The atomic ratio preferably satisfies Si/Fe≥1.1. Although the upper limit of Si/Fe is not necessarily specified, it is believed that the composition of the Si-based oxide is optimized when approximately Si/Fe≤3.0 is satisfied.

In addition, as a method for determining the ratio of $SiO_2$ in the Si-based oxide film, XPS may also be used. In this case, as the form of Si on the iron powder surface to be analyzed, besides metal Si solid-solved in Fe and $SiO_2$. $Fe_2SiO_4$ and $FeSiO_3$ may also be mentioned. When the spectra of Si2p are measured by XPS, as shown in the upper side graph (a) of FIG. 1, the peaks of metal Si (in Fe) and $SiO_2$ are observed in the vicinities of 99.6 eV and 103.5 eV, respectively. In addition, the peak of $Fe_2SiO_4$ is observed at approximately the center between the above two peaks, and further the peak of $FeSiO_3$ is observed at approximately the center between the peaks of $SiO_2$ and $Fe_2SiO_4$. Hence, when the actual Si2p spectra are peak-separated, the ratio of $SiO_2$ can be obtained. In addition, the graph (b) at the lower side of FIG. 1 is an analytical result of another iron powder sample formed in an example which will be described later.

When the ratio of $SiO_2$ in the whole Si-based oxide (approximately equivalent to the total of $SiO_2$, $Fe_2SiO_4$, and $FeSiO_3$) in the oxide film, which is obtained by the measurement method as described above, is 60 mass percent or more, a higher effect of improving magnetic properties can be obtained. Furthermore, in the above Si-based oxide, when the weight ratio of $SiO_2$ to $Fe_2SiO_4$ is 7 times or more, a higher effect of improving magnetic properties can be obtained. In addition, 7.0 times or more is more preferable. Although the upper limit is not necessarily limited, in general, it is 20 times or less.

The oxide film on the iron powder surface obtained through the Si deposition/surface enrichment treatment and the oxidation treatment is primarily composed of a Si-based oxide (in particular, $SiO_2$, $Fe_2SiO_4$, and $FeSiO_3$). In addition, whether the oxide film composed of a Si oxide base is formed or not can be determined by a surface analysis, such as the above XPS, when the peak of the Si-based oxide is maintained to a certain depth in a process for performing sputtering from the particle surface layer in a depth direction.

In this case, the thickness of the oxide film composed of a Si-based oxide and formed on the surface of the iron powder is not particularly limited, and for example, the effect can be obtained even at a thickness of approximately 0.01 μm. However, in order to stably obtain the effect of improving magnetic properties, a thickness of approximately 0.1 μm or more is preferable. On the other hand, when the thickness of the oxide film is excessively increased, the compression properties are unnecessarily degraded, and as a result, the magnetic flux density is decreased. Hence, in accordance with a targeted magnetic flux density, an upper limit of the thickness of the oxide film may be optionally determined. For example, the upper limit is preferably set to approximately 1.0 μm as a rough indication.

The thickness of the oxide film is defined by a surface analysis, such as the above XPS, as a depth at which the peak height of the Si-based oxide is one half of that of the surface layer when sputtering is performed from the particle surface layer in a depth direction.

In addition, compounds (primarily oxides) other than the Si-based oxide may be contained in the oxide film. That is, by a surface analysis, such as the above XPS, even when peaks of other compounds are further detected, any problems may not arise.

Hereinafter, preferable usage of the above iron powder of the present invention will be described by way of example.

When the above iron powder of the present invention is applied to a magnetic component such as a dust core, an insulation coating treatment is preferably further performed on the surface oxide film of the iron powder so as to form an insulating layer having a coating layer structure to cover the iron powder surface. As a material for the insulation coating, any material may be used as long as being capable of maintaining required insulating properties even after the iron powder is formed into a desired shape by compaction, and hence the material is not particularly limited. As the material described above, for example, oxides of Al, Si, Mg, Ca, Mn, Zn, Ni, Fe, Ti, V, Bi, B, Mo, W, Na, and K may be mentioned. In addition, a magnetic oxide, such as spinel ferrite, or an amorphous material, such as liquid glass, may also be used. Furthermore, as an insulation coating material, for example, phosphate chemical conversion coating or chromate chemical conversion coating may be mentioned. The phosphate chemical conversion coating may also contain boric acid and/or Mg.

In addition, as an insulating material, a phosphate compound, such as aluminum phosphate, zinc phosphate, calcium phosphate, or iron phosphate, may also be used. Furthermore, an organic resin, such as an epoxy resin, a phenol resin, a silicone resin, or a polyimide resin, may also be used. In addition, when the materials disclosed in the above Patent Document 3 (Japanese Unexamined Patent Application Publication No. 2003-303711) are used as the insulation coating material, any problems may not arise. In particular, as described above, a Si-based resin, such as a silicone resin, is suitably applied to the iron powder of the present invention.

By the way, in order to improve an adhesion force of the insulating material to the iron powder surface, or in order to improve the uniformity of the insulating layer, a surfactant and/or a silane coupling agent may also be added. When a surfactant and/or a silane coupling agent is added, the addition amount thereof is preferably set in the range of 0.001 to 1 mass percent with respect to the total amount of the insulating layer.

The thickness of the insulating layer formed on the iron powder-surface oxide film may be optionally determined in accordance with the degree of desired insulation level, and in general, the thickness is preferably set in the range of approximately 10 to 10,000 nm. That is, when the thickness is set to approximately 10 nm or more, a superior insulating effect is likely to be obtained. On the other hand, when the thickness of the insulating layer is excessively large, the density of a magnetic component is unnecessarily decreased, and as a result, a high magnetic flux density is unlikely to be obtained. Hence, the thickness of the insulating layer is preferably set to approximately 10,000 nm or less. The thickness of the insulating layer can be known, for example, by a method in which the iron powder is directly observed or by a method in which the conversion calculation is performed based on the amount of a supplied coating material.

As a method for forming the insulating layer as described above, any conventionally known film forming methods (coating methods) may be used. As a usable coating method, for example, a fluidized bed method, an immersion method, or a spray method may be mentioned. However, in every method, a step of drying a solvent which dissolves or disperses the insulating material is necessarily performed after the coating step or simultaneously therewith. In addition, in order to improve the adhesion of the insulating layer to the iron powder so as to prevent peeling therebetween during compaction, a reaction layer may be formed between the insulating layer and the iron powder surface. The formation of the reaction layer as described above is preferably performed by a chemical conversion treatment.

An iron powder (insulation coated iron powder) having insulating layers on surfaces of iron powder particles, which are formed by performing the insulation coating treatment as described above, is processed by compaction, so that a dust core is formed.

In addition, prior to the compaction, whenever necessary, a lubricant, such as a metal soap or an amide-based wax, may also be blended in the iron powder. The amount of the lubricant to be contained is preferably set to 0.5 mass percent or less with respect to 100 mass percent of the iron powder. The reason for this is that when the amount of the lubricant is increased, the density of the dust core is decreased.

As a compaction method, any conventionally known methods may be used. For example, there may be mentioned a die forming method in which compaction is performed at room temperature using a single-axial press, a warm compaction method in which compaction is performed under warm conditions, a die lubrication method in which compaction is performed using a lubricated die, a warm die lubricant method in which the compaction described above is performed under warm conditions, a high pressure forming method in which formation is performed at a high pressure, and a hydrostatic pressing method.

In addition, the dust core obtained as described above is preferably annealed at a temperature of 400° C. or more and more preferably in a temperature range of 600 to 1,000° C. to remove strain so as to improve the magnetic properties. In consideration of the effect and the economical aspect, the annealing time is preferably set to approximately 5 to 300 minutes and more preferably set to approximately 10 to 120 minutes.

EXAMPLES

Example 1

As an iron powder, a commercially available spherical iron powder (average particle diameter: 100 μm) was used. The Si content in the spherical iron powder was less than 0.01 mass percent. This iron powder was spread in a quartz container to have a thickness of 3 to 10 mm, and by a thermal CVD method, Si was deposited on the surface of the iron powder. In particular, after pre-heating was performed in an argon gas at 700 to 1,000° C. for 5 minutes, a $SiCl_4$ gas was supplied at a flow rate of 1 NL/min/kg for 1 to 30 minutes, so that Si was deposited on the surface of the iron powder. An oxidation treatment was performed during or after the Si deposition. The treatment temperature and time and the oxygen partial pressure were set as shown in Table 1.

An oxide film thus formed on the iron powder surface was analyzed by an XPS analysis, and the measurement results of the Si/Fe ratio, the amount of $SiO_2$, and the $SiO_2/Fe_2SiO_4$ ratio are also shown in Table 1. In this case, the thickness of the oxide film was in the range of 0.3 to 1.0 μm.

In this example, for the XPS measurement, AVIS-HS™ manufactured by KRATOS Inc. was used, and after Si2p and Fe2p spectra were measured using an AlKα monocrometer, by using a relative response factor method of Vision 2™ Software manufactured by KRATOS Inc., an atomic concentration was calculated.

Next, the iron powder provided with an oxide film was covered with a silicone resin by the following method. As the silicone resin, "SR2400"™ supplied from Dow Corning Toray Co. Ltd. was used. A coating liquid adjusted using xylene to contain 5 mass percent of a resin component was sprayed using a spray to the iron powder fluidized in a container provided in a tumbling fluidized bed coating apparatus so that 0.5 mass percent of the resins component is contained. After the spray was finished, in order to reliably perform drying, the fluidized state was maintained for 20 minutes. Furthermore, a heating treatment was performed in the air at 250° C. for 60 minutes so that the silicone resin was cured by heating, thereby forming an insulation coated iron powder. The insulating layer thus obtained has a thickness of approximately 0.5 μm.

The insulation coated iron powder thus obtained was processed by compaction, so that a ring-shaped dust core (outside diameter: 38 mm, inside diameter: 25 mm, and height: 6.2 mm) was formed for measurement. In addition, in the formation, an alcohol solution containing 5 mass percent of zinc stearate was applied to the inside of a die for die lubrication, and the formation was performed at a pressure of 980 MPa. The compacted powder body thus obtained was annealed in a nitrogen atmosphere at 800° C. for 60 minutes to remove strain.

The resistivity of the dust core thus obtained was measured, and the measurement result thereof is also shown in Table 1. In this example, the resistivity was measured at a supply current of 1 A using a four terminal method. As the resistivity is increased, the insulation in the boundaries (former surfaces of the iron powders) inside the dust core was improved, and hence a low iron loss was obtained.

TABLE 1

| No. | CVD TEMPERATURE (° C.) | CVD TIME (MIN) | OXYGEN PARTIAL PRESSURE (Pa) | OXIDATION TEMPERATURE (° C.) | OXIDATION TIME (MIN) |
|---|---|---|---|---|---|
| 1 | 700 | 30 | $10^{-13}$ | 700 | 10 |
| 2 | 800 | 10 | $10^{-11}$ | 800 | 10 |
| 3 | 900 | 5 | $10^{-7}$ | 900 | 10 |
| 4 | 1000 | 1 | $10^{-9}$ | 900 | 10 |
| 5 | 800 | 1 | $10^{-18}$ | 800 | 10 |
| 6 | 800 | 5 | $10^{-4}$ | 800 | 10 |
| 7 | 800 | 5 | $10^{-5}$ | 800 | 10 |
| 8 | 800 | 5 | $10^{-4}$ | 800 | 20 |
| 9 | 700 | 5 | $10^{-29}$ | 700 | 10 |
| 10 | 800 | 5 | $10^{-24}$ | 800 | 10 |
| 11 | 900 | 5 | $10^{-22}$ | 900 | 20 |
| 12 | 800 | 5 | $10^{-27}$ | 800 | 10 |
| 13 | 800 | 1 | $10^{-28}$ | 800 | 30 |
| 14 | — | — | — | — | — |
| 15*4 | 800 | 10 | $10^{-11}$ | 800 | 10 |
| 16*4 | 800 | 10 | — | — | — |
| 17 | 700 | 5 | $10^{-29}$ | 700 | 5 |

| | XPS ANALYSIS RESULT OF SURFACE OXIDE FILM | | | | |
|---|---|---|---|---|---|
| No. | Si/Fe*1 | $SiO_2$ AMOUNT*2 (MASS %) | $SiO_2/Fe_2SiO_4$*3 | RESISTIVITY (μΩm) | REMARKS |
| 1 | 2.15 | 78 | 8.6 | 2788 | INVENTION EXAMPLE 1 |
| 2 | 2.14 | 88 | 9.9 | 1290 | INVENTION EXAMPLE 2 |

TABLE 1-continued

| | | | | | |
|---|---|---|---|---|---|
| 3 | 2.14 | 89 | 10.1 | 1320 | INVENTION EXAMPLE 3 |
| 4 | 2.14 | 87 | 12.6 | 1250 | INVENTION EXAMPLE 4 |
| 5 | 2.75 | 66 | 6.8 | 363 | INVENTION EXAMPLE 5 |
| 6 | 3.92 | 76 | 6.3 | 295 | INVENTION EXAMPLE 6 |
| 7 | 2.56 | 79 | 4.5 | 250 | INVENTION EXAMPLE 7 |
| 8 | 3.92 | 76 | 7.2 | 460 | INVENTION EXAMPLE 8 |
| 9 | 0.86 | 60 | 3.0 | 90 | INVENTION EXAMPLE 9 |
| 10 | 1.05 | 60 | 3.2 | 126 | INVENTION EXAMPLE 10 |
| 11 | 1.32 | 58 | 2.8 | 158 | INVENTION EXAMPLE 11 |
| 12 | 0.7 | 40 | 1.0 | 12 | COMPARATIVE EXAMPLE 1 |
| 13 | 0.5 | 10 | 1.4 | 13 | COMPARATIVE EXAMPLE 2 |
| 14 | 0.41 | 6.3 | 0.1 | 8 | COMPARATIVE EXAMPLE 3 |
| 15*4 | 2.14 | 88 | 9.9 | 25 | INVENTION EXAMPLE 12 |
| 16*4 | 2.14 | 88 | 9.9 | 5 | COMPARATIVE EXAMPLE 4 |
| 17 | 0.95 | 51 | 3.1 | 85 | INVENTION EXAMPLE 13 |

*1QUANTITATIVE RESULT OF SURFACE ATOMIC RATIO BY XPS
*2PEAK SEPARATION RESULT OF Si2p BY XPS
*3PEAK SEPARATION RESULT OF Si2p BY XPS
*4POLYIMIDE USED FOR INSULATION COATING

As apparent from Table 1, all iron powders provided with the oxide films of the present invention on the surfaces thereof showed a high resistivity. On the other hand, in comparative examples in which the Si/Fe ratio of the surface oxide film was less than 0.8, only a low resistivity was obtained.

In addition, for reference, in the graph (b) at the lower side of FIG. 1, the peak separation by XPS of Si2p of the oxide film of invention example 2 corresponding to No. 2 in Table 1 is shown. In this example, an ideal peak separation which indicates a high weight ratio of $SiO_2$ is shown, and hence, it is believed that a high resistivity as shown in Table 1 can be obtained.

INDUSTRIAL APPLICABILITY

In the iron powder for dust cores according to the present invention, since a Si-based oxide film having a composition in which the atomic number ratio satisfies Si/Fe≥8 is formed on the surface of an iron powder, a dust core having a high resistivity and hence having a low iron loss can be obtained.

In addition, in accordance with the present invention, when the $SiO_2$ ratio in the Si-based oxide film is set to 60 mass percent or more, and further when the weight ratio of $SiO_2$ to $Fe_2SiO_4$ in the Si-based oxide film is controlled to be 7 times or more, a low iron-loss dust core having more superior properties can be obtained.

Furthermore, in the present invention, since it is not necessary that a large amount of Si be contained inside the iron powder, superior compression properties are obtained, and as a result, mechanical properties of the dust core are not degraded.

The invention claimed is:

1. An iron powder for dust cores comprising:

a plurality of iron particles, the iron powder having an average particle diameter in the range of about 10 to 500 μm; and an oxide film provided on the surface of the iron particles, wherein the oxide film is obtained by the steps of:

depositing Si on the surface of the iron particles by a thermal CVD method at a temperature in a range of 700° C. or more and 900° C. or less in a non-oxidizing atmosphere, and performing oxidation treatment during or after the Si deposition in an atmosphere having an oxygen partial pressure of $10^{-24}$ Pa to $10^{-4}$ Pa, and the oxidized film is composed of a Si-based oxide in which an atomic ratio satisfies Si/Fe≥1.05 and the weight ratio of $SiO_2$ to $Fe_2SiO_4$ is 4.5 times or more.

2. The iron powder for dust cores according to claim 1, wherein the Si-based oxide contains 60 mass percent or more of $SiO_2$.

3. The iron powder for dust cores according to claim 1, wherein in the Si-based oxide, the weight ratio of $SiO_2$ to $Fe_2SiO_4$ is seven times or more.

4. The iron powder for dust cores according to claim 2, wherein in the Si-based oxide, the weight ratio of $SiO_2$ to $Fe_2SiO_4$ is seven times or more.

* * * * *